June 6, 1950
L. S. ROSS
2,510,420
JUICE EXTRACTING MACHINE HAVING COMBINED
ROTARY CUTTER AND DISCHARGE MEANS
Filed June 11, 1945
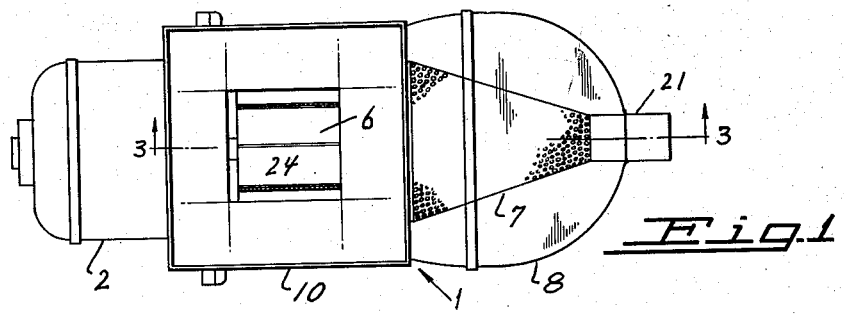
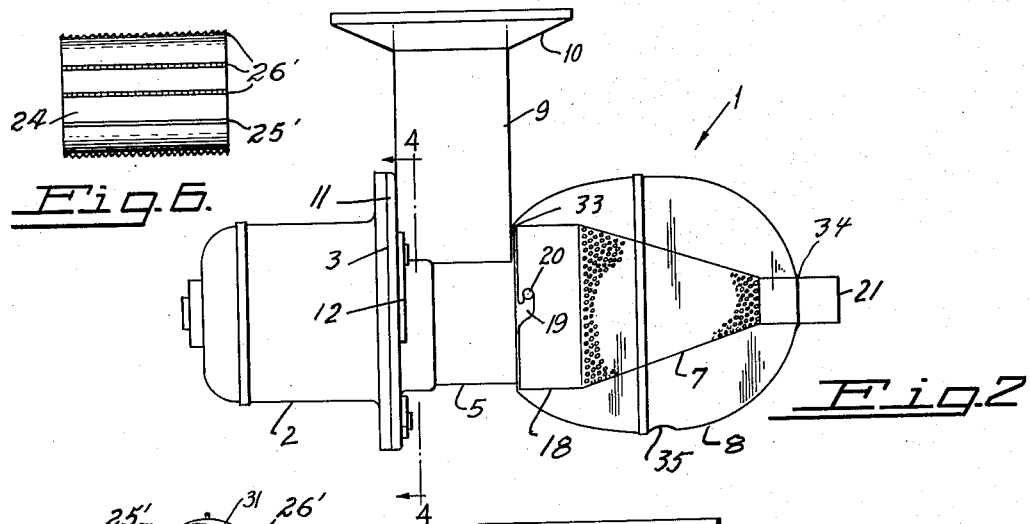
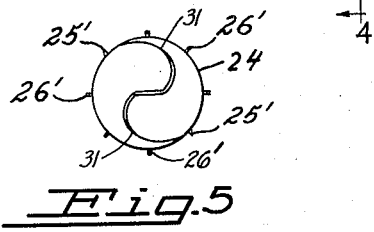
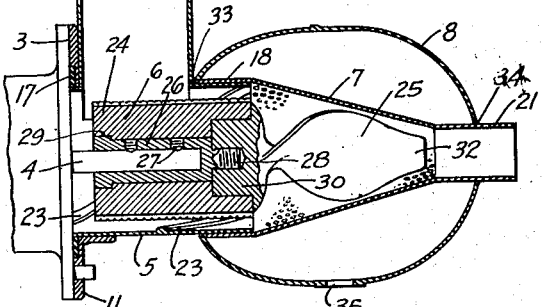
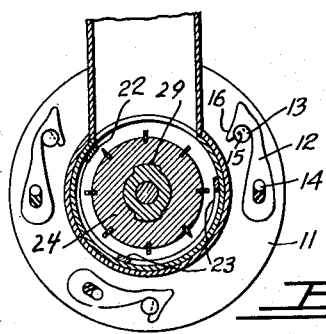
INVENTOR.
Leland S. Ross
BY
A. Schapp
ATTORNEY Patented June 6, 1950

2,510,420

UNITED STATES PATENT OFFICE 2,510,420

JUICE EXTRACTING MACHINE HAVING COMBINED ROTARY CUTTER AND DISCHARGE MEANS

Leland S. Ross, Oakland, Calif.

Application June 11, 1945, Serial No. 598,861

2 Claims. (Cl. 146—76)

The present invention relates to improvements in juice extracting machines having combined rotary cutter and discharge means, and its principal object is to provide a machine of the character described that is simple, highly efficient, durable, easy to operate and easy to clean.

More particularly it is proposed to provide a machine of the character described that is continuous in operation, discharging juice radially and pulp axially with respect to the axis of rotation.

It is further proposed to provide a juice extracting machine in which the juice is separated from the pulp through both squeezing and centrifugal action whereby the machine is rendered highly efficient.

It is further proposed to combine a macerating element and an impelling element into a single unit and to mount the same for rapid rotation, whereby the impelling element is made to draw on the material acted on by the macerating element and to aid in advancing the material through the machine, so that the latter is rendered substantially self-cleaning and self-exhausting.

It is a still further object of the invention to discharge the juice by centrifugal force and through a conical screen, with the effect that the juice is discharged in all directions, while the conical form of the screen serves to retard the advance of the material and to remove all the liquid therefrom.

Another object of my invention is to provide a substantially ball-shaped collecting cup for the juice which completely surrounds the conical screen and collects all the juice for discharge through a bottom aperture.

And finally, it is proposed to provide a novel and particularly effective means for securing the juice extractor upon the body of a motor and to provide other structural details and arrangements particularly adapted to increase the efficiency and durability of the machine.

Further objects and advantages of my invention will appear as the specification proceeds, and the novel features of my juice extractor will be fully defined in the claims hereto attached.

The preferred form of my invention is illustrated in the accompanying drawing forming part of this application, in which:

Figure 1 shows a top plan view of my machine;

Figure 2, a side elevation thereof;

Figure 3, a longitudinal axial section through my juice extractor;

Figure 4, a transverse section taken along line 4—4 of Figure 2;

Figure 5, an end view of my combined macerating and impelling element, and

Figure 6, an enlarged fragmentary side view of the macerating element.

While I have shown only the preferred form of my invention, I wish to have it understood that various changes or modifications may be made within the scope of the claims hereto attached, without departing from the spirit of the invention.

Referring to the drawing in detail, my juice extracting machine 1 is made for attachment to a motor 2 formed with a flat end face 3 and having a shaft projecting therefrom. The juice extracting machine comprises in its principal features, a housing 5, a rotor 6 revolvable therein, a screen 7 removably secured upon the housing, and a collecting cup 8 surrounding the screen.

The housing 5 is cylindrical in shape and has a radial chute 9 leading thereinto vertically. The chute terminates in a hopper 10 through which fruit or vegetable may be fed into the cylindrical part of the housing, a suitable plunger being used to drive the fruit or vegetable downward.

The housing is formed with a flange 11 adapted to lie flat against the face of the motor housing, in concentric relation with the shaft 4, and to be securely fastened thereon by means of a plurality of latches 12.

In the fastening arrangement the motor housing has a plurality of pins or studs 13 projecting therefrom, preferably one vertically below the shaft and two spaced 120° therefrom, and the flange is formed with registering holes adapted to pass over the pins.

The latches 12 are pivoted to the flange in operative proximity to the pins 13, as at 14, and are engageable over slots or grooves 15 formed in the sides of the pins, the slots being located to firmly press the flange upon the face of the motor housing when engaged by the latches. The latter are formed with hooks 16 at their free ends to engage over pins 13, and their bearing about the pivots 14 are slightly elongated to accommodate a certain amount of elastic material, such as rubber, which is adapted to yield when the hooks are snapped into the slots and to retract the latches thereafter.

In fastening the flange upon the motor housing, the preferred method is to first apply the two upper latches and to then firmly press the lower part of the flange against the housing for applying the lower latch. A suitable gasket 17 is preferably provided between the contacting faces.

The screen 7 is tapered or conical in shape and has a cylindrical section 18 projecting from its larger end to fit over the end of the housing and to be secured thereto by oppositely arranged bayonet slots 19 fitting over pins 20. The smaller and outer end of the screen terminates in a discharge conduit 21 through which the pulp is removed, after the juice has been extracted.

The cylindrical housing is formed on its inside with a straight cutting blade 22. This blade is located where the chute discharges into the hopper, and at the rear end of the chute as compared with the direction of rotation of the rotor.

Two additional blades 23 are provided in the housing and these blades are spiral in form. They serve the purpose of an additional cutting means and also to cooperate with the rotor in advancing the material toward the screen.

The rotor 6 comprises in its principal parts a cylindrical macerating element 24 revolvable in the housing and an impeller or spinner 25 revolvable in the screen.

The macerating element is a rather heavy cylindrical body of a diameter somewhat less than that of the housing and has a series of longitudinal blades projecting from the surface thereof so as to just clear the blades on the inside of the housing. Two of the blades indicated at 25' are preferably made with straight cutting edges to cut against the fixed blades, while the remaining ones shown at 26' are formed with sawtooth serrations to macerate the material fed through the chute.

The macerating element is secured upon the motor shaft 4 by means of a mandrel 26 fastened upon the shaft by set screws 27. The mandrel fits upon the shaft and has a threaded stud 28 projecting from the free end thereof, in axial alinement with the shaft.

The mandrel 26 has two keys 29 mounted upon the rear end thereof to receive registering keyways in the inside of the macerating element when the latter is pushed upon the mandrel.

The macerating element is held against endwise movement on the mandrel by the impeller 25 which has a reduced extension 30 fitting in a socket in the macerating element and threaded upon the stud 28. The thread is formed to tighten the engagement when the rotor rotates.

The impeller or spinner 25 is made of two blades 31 which are shaped to feed the material endwise toward the outlet 21 and which present a tapered outline corresponding to the taper of the screen. The blades terminate and merge into a flat section 32 opposite the discharge conduit 21.

As will be seen from Figure 4, the macerating element rotates anti-clockwise, that is, toward the straight cutting blade 22, and the spinner, as viewed in Figure 5, rotates in the same direction. The two blades 31, in their sections adjacent the macerating element, are curved in the direction of rotation to form scoops, which scoop up the material as it leaves the cylindrical housing and advance the material toward the outlet. At a distance from the macerating element the blades merge into the flat section 32 which applies centrifugal force to the material so as to discharge the juice through the screen, while the pulp advances toward the discharge.

The cup 8 is preferably made ball-shaped to surround the entire screen and is made of transparent material to allow the action of the machine to be observed. It is formed with openings 33 and 34 at opposite ends to fit over the cylindrical section 18 and the discharge conduit 21, and has a liquid discharge opening in the bottom, as at 35.

The manner of assembling my machine is very simple:

The mandrel 26 is secured upon the motor shaft by means of the set screws 27. The macerating element is pushed upon the mandrel and is held against rotary motion by the keys 29 and against endwise motion by screwing the impeller 25 on the stud 28.

The screen 7 is then slid over the housing and secured by means of the bayonet slots 19. The housing is secured upon the motor housing by means of the three latches 12. The cup 8 is then applied by a simple sliding movement.

In operation, as the material, such as fruits or vegetables, is forced down the chute by means of a suitable plunger, the saw-tooth blades of the macerating element tear it into fine shreds and the rapid rotation against the fixed blades comminutes the material into fine particles.

Any long fibres or strings which might tend to wrap themselves around the rotating cylinder will be cut up by the action of the smooth cutting blades against the fixed blades.

The shape of the fixed blades tends to urge the material forward toward the screen and this forward motion is greatly intensified by the action of the impeller. The latter sets up a strong centrifugal force which throws the liquid outward through the entire screen area and crowds the lighter solid particles toward the axis for discharge through the conduit 21.

The conical shape of the screen, and the relatively small discharge conduit, sets up a resistance to the advance of the material and effects a thorough separation of the liquid or juice from the solid matter, which latter is discharged through conduit 21 in the form of a practically dry pulp.

The cup catches the liquid or juice and discharges the same through the bottom opening 35, where it may be collected in a glass or other suitable container.

I claim:

1. In a juice extracting machine, a cylindrical housing having a macerating element revolvable therein and having a chute for feeding juicy material thereinto, a motor for rapidly rotating the macerating element to produce a juicy pulp, a conical screen projecting from one end of the housing and having an axial discharge at its free end, and a spiral spinner in the screen having one end secured upon the macerating element and having a free end opposite the discharge end, the spinner having blade sections adjacent the macerating element curved in the direction of the rotation to provide scoops for axially advancing the material toward the outlet, the housing having a fixed cutting blade adjacent the chute and the macerating element having a series of blades cooperable with the fixed blade in macerating material fed through the chute, some of the latter blades having serrated edges to tear the material and others having straight cutting edges cooperable with the fixed blade in cutting long fibres or strings tending to wrap themselves about the macerating element.

2. In a juice extracting machine, a cylindrical housing having a macerating element revolvable therein and having a chute for feeding juicy material thereinto, a motor for rapidly rotating the macerating element to produce a juicy pulp, a conical screen projecting from one end of the housing and having an axial discharge at its free end, and a spiral spinner in the screen having one end secured upon the macerating element and having a free end opposite the discharge end, the spinner having blade sections adjacent the macerating element curved in the direction of the rotation to provide scoops for axially advancing the material toward the outlet, the scoops merging approximately midway of the length of the spinner into a single, flat blade applying centrifugal force to the material so as to discharge the juice through the screen while the pulp advances toward the discharge, the housing having a fixed cutting blade adjacent the chute and the macerating element having a series of blades cooperable with the fixed blade in macerating material fed through the chute, some of the latter blades having serrated edges to tear the material and others having straight cutting edges cooperable with the fixed blade in cutting long fibres or strings tending to wrap themselves about the macerating element.

LELAND S. ROSS.

REFERENCES CITED

The following references are of record in the file of this patent:

UNITED STATES PATENTS

| Number | Name | Date |
|---|---|---|
| 19,421 | Helton | Feb. 23, 1858 |
| 122,287 | Slatcher | Dec. 26, 1871 |
| 750,688 | Liedbeck | Jan. 26, 1904 |
| 1,133,254 | Backus | Mar. 30, 1915 |
| 1,353,420 | Reno et al. | Sept. 21, 1920 |
| 1,473,776 | Levin | Nov. 13, 1923 |
| 1,747,970 | De Vito | Feb. 18, 1930 |
| 1,750,764 | Schaefer | Mar. 18, 1930 |
| 1,815,829 | Brown, Jr. | July 29, 1931 |
| 2,042,161 | Satzinger | May 26, 1936 |
| 2,142,480 | Satzinger | Jan. 3, 1939 |
| 2,288,926 | Strader | July 7, 1942 |
| 2,315,028 | Thomas | Mar. 30, 1943 |
| 2,322,791 | De Back | June 29, 1943 |
| 2,325,006 | Crawford | July 20, 1943 |
| 2,326,682 | Roddy | Aug. 10, 1943 |
| 2,345,683 | Owens | Apr. 4, 1944 |

FOREIGN PATENTS

| Number | Country | Date |
|---|---|---|
| 179,529 | Germany | Dec. 13, 1906 |
| 596,901 | Germany | May 14, 1934 |